United States Patent [19]
Russell et al.

[11] Patent Number: 5,558,968
[45] Date of Patent: Sep. 24, 1996

[54] DENDRIMERIC TONER PARTICLES FOR LIQUID ELECTROPHOTOGRAPHY

[75] Inventors: Dale D. Russell; James G. Bearss, both of Boise, Id.

[73] Assignee: Hewlett-Packard Company, Palo Alto, Calif.

[21] Appl. No.: 378,425

[22] Filed: Jan. 26, 1995

[51] Int. Cl.$^6$ .................................................. G03G 9/00
[52] U.S. Cl. ...................... 430/109; 430/112; 430/114; 430/115; 430/116; 430/117; 430/118; 430/119
[58] Field of Search .................................. 430/109, 112, 430/114, 115, 116, 117, 118, 119

[56] References Cited

U.S. PATENT DOCUMENTS

| | | | |
|---|---|---|---|
| 4,897,332 | 1/1990 | Gibson et al. | 430/115 |
| 4,925,766 | 5/1990 | Elmasry et al. | 430/115 |
| 5,045,425 | 9/1991 | Swidler | 430/115 |
| 5,098,475 | 3/1992 | Winnik et al. | 106/22 |
| 5,120,361 | 6/1992 | Winnik et al. | 106/22 |
| 5,256,516 | 10/1993 | Winnik et al. | 430/110 |
| 5,332,640 | 7/1994 | Duff et al. | 430/110 |
| 5,407,771 | 4/1995 | Landa et al. | 430/114 |

FOREIGN PATENT DOCUMENTS

WO93/06868  4/1993  WIPO .............................. A61K 49/00

OTHER PUBLICATIONS

Tomalia, Donald A. "Starburst™/Cascade Dendimers: Fundamental Building Blocks for a New Nanoscopic Chemistry Set" 1963, *Aldrichimica Asta*, vol. 26, No. 4; pp. 91–101.

*Primary Examiner*—Geraldine Letscher

[57] ABSTRACT

This invention comprises a single-component dendrimeric toner particle, and methods of making and using the toner particle in the liquid EP process. By using dendrimeric chemistry, a dendrimeric toner particle may be made that has controlled content, structure and size and that includes a colorant, a binder, and a charge director. The toner particles made this way will have high uniformity, so that toner dispersions containing them may be made to have good stability, print performance, and quality control. The colorant of choice for the toner particle is made the core of the dendrimer toner particle. Dendrons, which are made of generations of building or polymer units, branch out from the core and include a resin or other binder molecule, for binding the colorant to the paper in the EP process. One or more of the final polymer units, located at the terminus of the dendrons, comprise a coordinating or chelating agent for the toner charge director.

8 Claims, 1 Drawing Sheet

DENDRIMERIC TONER PARTICLES FOR LIQUID ELECTROPHOTOGRAPHY

FIELD OF THE INVENTION

This invention relates to a toner particle intended for dispersion in a liquid medium, for use in electrophotography (EP). The toner particle has a controlled content, structure and size, and is made using dendritic polymerization chemistry.

BACKGROUND OF THE INVENTION

Toner Functions

In order to develop the intended image in an electrophotographic hardcopy device, liquid toners must perform the following functions:

a. Have color, including black;

b. Form a stable dispersion in the carrier liquid, or else form an intentionally unstable dispersion that is readily re-dispersed on demand in the EP hardcopy device;

c. Possess electrical charge on a permanent or at least semipermanent basis, in order to respond to the imposed electrical bias which is the driving force in this imaging technique; and, d. Have a fusible resin coating layer that imparts permanence and durability to the hardcopy image.

Prior Toner Synthesis

The prior art teaches the above toner functions a–d, but shows them to be performed by several different parts of the toner particle. The synthesis of these prior toners involves many steps and is complex. These toner-synthesis processes do not lend themselves well to continuous manufacturing processes and are often performed in batch mode. This introduces batch-to-batch variation, and increases the need for careful quality control.

The following are typical of the many patents teaching this multicomponent kind of toner: Gibson et al., U.S. Pat. No. 4,897,332; Elmasry et al., U.S. Pat. No. 4,925,766; Swidler. and U.S. Pat. No. 5,045,425. Usually a dye or pigment provides the colorant material for the toner particle. A polymeric resin is bound to the colorant via specific or nonspecific adsorption to the surface of the colorant. A charge director is added, and sometimes charge enhancers are also added to assist in binding the charge to the particle. There may be additional surfactants and release agents to stabilize the dispersion of toner particles in the carrier liquid or to promote transfer of the developed image to the receiving paper or other medium.

Besides being multicomponent systems, these prior toners are highly polydisperse in terms of particle identity, particle size and electrophoretic mobility. A toner dispersion of this type typically contains free (uncoated) pigment chunks, resin-coated pigment chunks, free resin, free charge director, and aggregates of all sizes up to 100 microns or more in diameter. This polydispersity impacts negatively on dispersion stability, shelf life, print quality, and even the ability to characterize the dispersions with off-line analytical techniques.

Dendritic Polymers

A review of the synthesis, characterization and applications of dendritic polymers ("dendrimers") reveals that they have been known since 1978. Dendrimer chemistry is discussed in general in "Starbursts™/Cascade Dendrimers: Fundamental Building Blocks for a New Nanoscopic Chemistry Set", by Donald A. Tomalia, *Aldrichimica Acta*, Vol. 26, No. 4, 1993, pages 91–101. Dendrimers are monodisperse enough to be used as size calibration standards. (D. A. Tomalia, L. R. Wilson, European Patent Application 247629 A2, Dec. 2, 1987; P. L. Dubin, et al. *Anal. Chem.,* 1992, 64(20) 23344–7.) One-step syntheses of dendrimers have been reported. (C. J. Hawker, R. Lee, J. M. J. Frechet, *J. Amer. Chem. Soc.,* 1191,113(12).; T. M. Miller, et al. *J. Amer. Chem Soc.,* 1993,115(1) 356–7.) The comb-burst dendritic topology permits dendritic grafting onto other (non-dendritic) molecules. (D. A. Tomalia, et al. *Macromolecules,* 1991, 24(6) pp 1435–8.) Size, shape, surface chemistry, topology and flexibility of dendrimers are all controllable parameters. (D. A. Tomalia, D. M. Hedstrand, *Actual. Chim.* 1992,5(347).) Glass transition temperature of dendrimers is also controllable. (K. L. Wooley, et al. *Macromolecules,* 1993, 26(7)1514–19.)

Dendrimers have been applied in imaging technologies other than electrophotography, such as jet-printing inks and medical imaging. Winnik. et al., U.S. Pat. No. 5,098,475, "Inks with Dendrimer Colorants" and Winnik. et al., U.S. Pat. No. 5,120,361, "Ink Compositions" disclose aqueous ink compositions with a dendrimer that is colored with a dye or dyes covalently attached thereto and ink compositions comprising a dendrimer and a dye or dyes, respectfully. Watson, PCT International Application, WO 93/06868 A1, "Dendrimeric Polychelants" discloses dendrimeric polychelants for medical imaging, "comprising an up to fifth generation dendrimeric backbone moiety with linked thereto a plurality of macrocyclic moieties capable of complexing metal ions, and metal chelates and salts thereof".

Dendrimers have been disclosed for use as charge-enhancing additives for electrophotography toners. Duff, et al., U.S. Pat. No. 5,332,640 discloses multicomponent toner compositions comprising resin particles, pigment particles, and dendrimeric charge enhancing additives, wherein these toner components are combined by such methods as dry blending techniques, extrusion melt blending, or encapsulation.

SUMMARY OF THE INVENTION

This invention comprises a single-component toner particle, for the liquid EP process, which is constructed using dendritic polymerization chemistry. The invented dendrimeric toner particle may be made by any successful dendritic method that constructs a toner particle wherein the core comprises a colorant, and main branches or "dendrons" extend out from the core. Each dendron is made of one or more dendron building unit or "polymer units". At least one, and preferably each, dendron comprises a resin molecule or other binder molecule for binding the colorant to the paper in the EP process. One or more or the final polymer units, which are located at the terminus of the dendrons, comprises a chelating group for a charge director for responding to the imposed electrical bias which is the driving force in the EP process.

The pigment, dye or colorant of choice for the toner particle is made the center ("core") of a dendritic polymerization scheme. The only requirement, from the point of view of the synthetic process, is that the colorant must possess, or have added to it, chemically functional groups that allow attachment of the building units for the dendritic polymer. Provided this condition is met, the colorant may then be selected based on other considerations such as hue, color intensity, lightfastness, non-toxicity, and the like. For example, Pigment Red 81, with its 1° amine (primary amine) functional groups —$NHC_2H_5$ and hydrolyzable ester functional group —COOC$_2$H$_5$, is a colorant that may be made the core of a dendritic polymerization scheme.

If the chosen colorant has high symmetry of functional groups that lend themselves well to derivatization, then the dendrimer building units may be initiated directly onto the colorant molecule or particle, by "growing" the dendrimer main branches, or "dendrons", layer by layer out from the core. The toner particle enlarges as dendrimer building units are added in successive layers, also called "generations" or "shells". Each new layer is added by reacting monomeric building units, also called "polymer units", "repeating units" or "branch cells", with the active sites on the previous layer. This divergent in-situ construction of the dendrons around an initiator core is known in the literature to be a successful route to the preparation of dendritic polymers.

Alternatively, if the colorant lacks sufficient symmetry or otherwise does not lend itself well to derivatization, then the dendrons may be prepared separately and fed into the synthetic reaction, thus coupling complete dendrons to the core, which acts as an attractor. This method of adding pro-formed dendrons onto the core is also known in the literature to be a successful route to the preparation of dendritic polymers, but may produce less symmetrical, but still monodisperse, comb-type polymers. This method has been called divergent core anchoring.

Alternative methods of dendrimer construction, called convergent methods, have also been discussed in the literature. Convergent methods involve a "reiterative coupling of protected/deprotected branch cells to produce a focal point functionalized dendron, followed by divergent core anchoring to produce various multi-dendron dendrimers" (Tomalia, supra).

The preferred active sites for extension or "growing" of the dendrons include nitrogen-, sulfur-, oxygen-, silicon-, and phosphorous-containing sites. Such active sites on the growing dendrimer will produce families of dendrimers that include poly(amidoamines), poly(ethers), poly(siloxanes), poly(amidoalcohols), poly(amines), poly(phosphonium), poly(alkanes), poly(acrylates).

The active site on the terminus of the growing dendrimer can be the same or different on each successive layer, as desired. This concept is especially useful in terminating dendrimer growth with a desired charge director. When the dendrimer is within one building-unit length of the size desired, a final building unit is added having as its terminal group or groups a coordinating group, herein also called a "chelating agent(s)" or "chelating group", for the charge director. Chelating groups include, preferably, one or more of the following electron pair donating atoms: nitrogen, oxygen, sulfur or phosphorous. The counter ion for the charge director may already be associated with the chelating group when it is added to the dendrimer, or alternatively, may be ion-exchanged in later.

By using dendrimeric chemistry, a single-component toner particle may be made that has controlled content, structure and size and that includes a colorant, a binder, and a charge director. The toner particles made this way will have high uniformity, so that toner dispersions containing them may be made to have good stability, print performance, and quality control.

DETAILED DESCRIPTION OF THE INVENTION

Dendrimer is the name of a fairly new family of oligomers. The word was coined from a combination of dendron (Greek for "tree") and polymer. Retaining the allusion to trees, some chemists refer to dendrimers as arborols, from the Latin word for tree, although dendrimer appears to be emerging as the preferred name.

Dendrimers are highly-branched and usually have a curved structure, just as the outline of many trees is curved, particularly when in leaf. And just as there are spaces between the branches of a tree, there are spaces within the dendrimers' molecular structure. These intramolecular spaces might be used to harbor agrochemicals, drugs, or fragrances, for instance, to be released slowly as required.

An important difference between linear polymers and dendrimers is that a linear polymer consists of an entanglement of single molecular chains. Dendrimers, by contrast, are more three-dimensional, for example, spheroid-shaped, cylinder-shaped, or ellipsoid-shaped. In a dendrimer, the plurality of dendrons, and the branching-out of each dendron as it extends out from the dendrimer, may give rise to a very high number of terminal functional groups in each dendrimer molecule.

As is well-known in the literature, dendrimers of various generation numbers may be constructed by various methods, for example, the divergent method or convergent method (Tomalia, "Starburst™/Cascade Dendrimers: Fundamental Building Blocks for a New Nanoscopic Chemistry Set", *Aldrichimica Acta*, Vol. 26, No. 4, 1993, pages 91–101). Dendrimer generations may be repeating units of the same monomer, resulting in the active sites on the terminus of the growing dendrimer being the same for each generation. Alternatively, each generation or some generations may comprise a different monomer, resulting in the active sites on the terminus of the growing dendrimer being different for each or some generations.

Dendrimers may grow from a core having high symmetry of functional groups and may have every functional group at the terminus of each shell reacting with a polymer unit of the next shell to form concentric saturated shells—resulting in a highly symmetrical dendrimer. Alternatively, dendrimers may also grow from a core with unsymmetrical functional groups and/or may have functional groups at the terminus of some or all of the shells that do not react with another polymer unit—resulting in less symmetrical, unsaturated-shell dendrimers (Tomalia, supra).

Figure 1:
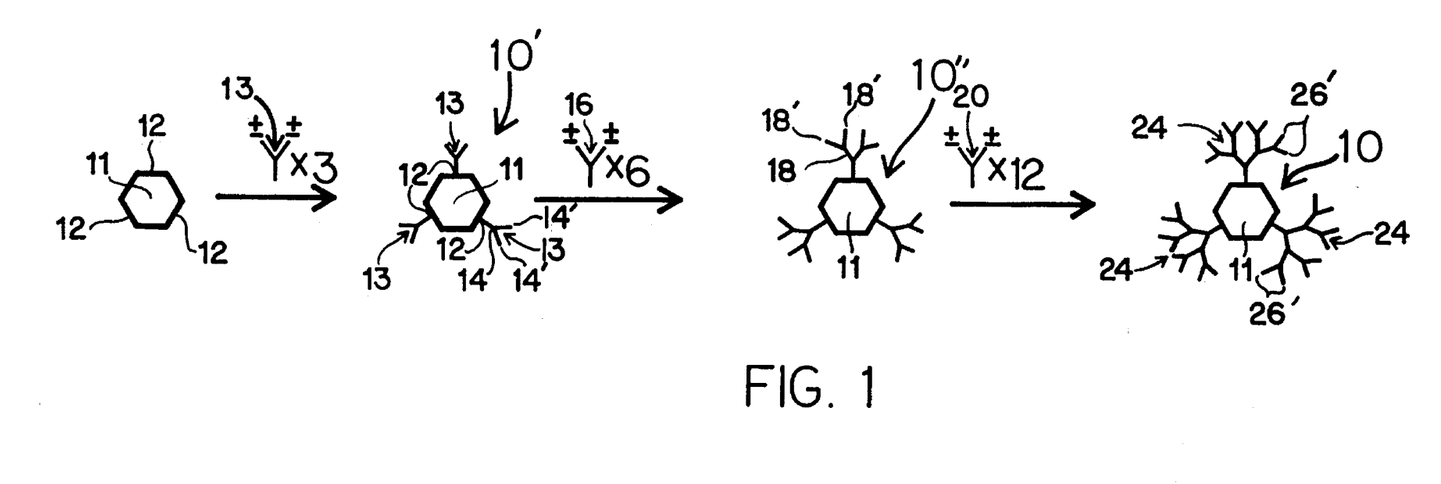
FIG. 1 is a schematic representation of the process of making a three-layer dendrimer around a pigment core particle.

Referring to FIG. 1, there is depicted schematically the process of constructing, according to the invention, an example of a single-component dendrimeric toner particle: a symmetrical, three-layer dendrimer 10 around a pigment core particle 11. Core particle 11 is a pigment, dye, or other colorant component of choice, possessing functional groups 12 that allow attachment to core particle 11 of the first layer of dendrimeric building units, herein called polymer units 13. Functional groups 12 are active sites for initiation of the dendrimeric polymer. Preferred active sites include nitrogen-, sulfur-, oxygen-, silicon- and phosphorous-containing sites, and they may be in the core particle 11 itself, or pendent from it. Preferred core particles 11 are carboxylated, hydroxylated, halogenated or aminated dyes. For example, xylenol orange or Pigment Red 81 may be used. Preferred functional groups 12 are carboxyl, hydrolysable ester, hydroxyl, primary and secondary amines, or halogen. Functional groups 12 may be inherently present in the colorant or dye of core particle 11. Alternatively, functional groups 12 may be converted onto the colorant, for example, by covalent bond formation between another type of functional group on the dye and a bi-functionalized reagent, such as a reagent containing a sulfonate or nitrate. Nitrate may then be reduced to amine, for example, to form a functional group 12. The combination of core particle 11 plus functional Groups 12 is the center ("core") of a dendritic polymerization scheme.

First layer dendritic, polymer units 13 are reacted with functional groups 12 to create the first generation 10' of dendrimer 10. Polymer units 13 are preferably selected to be bi-functional and may have either the same or different functional groups at opposing ends of the molecule: first functional end 14 and second functional ends 14'. First functional ends 14 selectively reacts with functional groups 12 on core particle 11, attaching polymer units 13 to particle 11. In this way, the polymer units 13, are attached to particle 11 at a specific point (the combination of functional group 12 and first functional end 14), and they have pendent second functional ends 14', which become the active sites, at the terminus of the first generation, for building the next generation of the dendrimer. If first functional end 14 and second functional end 14' are identical, for example when both are —COOH, then either end 14, 14' can react with functional groups 12, leaving an identical pendent functional group that does not react with any more monomer but, rather, becomes an active site for building the next generation.

Second layer dendritic polymer units 16 are reacted with functional ends 14' to create the second generation 10" of dendrimer 10, in a manner similar to the construction of the first generation 10'. The polymer units 16 may be selected to have different or the same functional groups at opposing ends: first functional end 18 and second functional ends 18'. If the functional ends 18, 18' are different, the first functional ends 18 selectively reacts with functional ends 14', attaching polymer units 16 to polymer units 13. In this way, the polymer units 16 are attached to polymer units 13 at a specific point (the combination of functional ends 14' and first functional end 18), and they have pendent second functional ends 18', which do not react with functional ends 14' but become the active sites, at the terminus of the second generation, for building the next generation of the dendrimer. Alternatively, as in the construction of the first generation, if the functional ends 18, 18' are identical, then either end 18, 18' can react with functional groups 14', leaving an identical pendent functional group that does not react with any more monomer but, rather, becomes an active site for building the next generation.

Preferred polymer units 13 and 16 for the first and second layers of the dendrimeric toner particle 10, or other interior layers of other dendrimeric toner particle embodiments, are bi-functionalized aliphatic or olefin chains having between 4 and 20 carbon atoms. For example, such chains may be 1,9 -nonanedicarboxylic acid; 1,10-decane dicarboxylic acid; 1,12-dodecane dicarboxylic acid; 1,9-diaminononane; 1,10-diaminodecane; or 1,12-diaminododecane. These aliphatic or olefinic chains act as a resin in the EP process. The term "resin" herein and in the claims refers to any polymer having a suitable $T_g$ (glass transition temperature), which may be used as a binding agent for fixing the colorant onto paper or other medium in the EP process.

The third and final generation of the dendrimer 10 in FIG. 1 is constructed when the third layer dendritic polymer units 20 react with the second layer polymer units 16, in a manner similar to the construction of the first and second generations. The resulting dendrimer has a symmetrical structure, with three symmetrical dendrons 24, with each dendron being defined as a main branch or arm, comprising polymer units, that begins at and extends out from the core. In the dendrons 24 of FIG. 1, each of the two pendent functional groups (functional ends 14', 18') of each polymer unit 13,16 have reacted with another polymer unit—resulting in full shells or "a saturated monomer shell" at each layer of the dendrimer 10. The resulting outer surface or "terminus" of the dendrimer 10 has 24 terminal groups 26'. In other words, this embodiment has three active sites on the core from which are grown three dendrons. Each dendron comprises three generations of polymer units, wherein the polymer units of each generation each have two outer functional ends. The terminus, or outer surface, of the dendrimer therefore has 3×2×2×2=24 terminal functional ends.

According to this invention, the preferred final polymer units, which may also be called "final units", "terminating units", "terminal units", "final layer", "final repeating units", etc., are molecules having terminal groups that are coordinating groups, herein also, called "chelating agents" or "chelating groups", for charge director ions. The counter ion for the charge director may already be associated with the chelating group when it is added to the dendrimer, or alternatively, may be ion-exchanged in later. The chelating agent groups may include any chelating agent, complexing agent, clathrating agent, cryptating agent, or other coordinating agent. Also, the chelating agent groups may include cage complex molecules, which feature the ability, by their geometry and donor site chemistry, to encapsulate or enclose a charged ion, and to trap such an ion in a relatively permanent position. Such cage complex molecules have: 1) at least three chains, with at least one electron pair donor atom (EPD) in each chain, for a total of at least three electron pair donor atoms, or 2) at least two connected rings, with a total of at least three EPD's in the molecule including at least one EPD in each of the connected rings.

Figure 2:
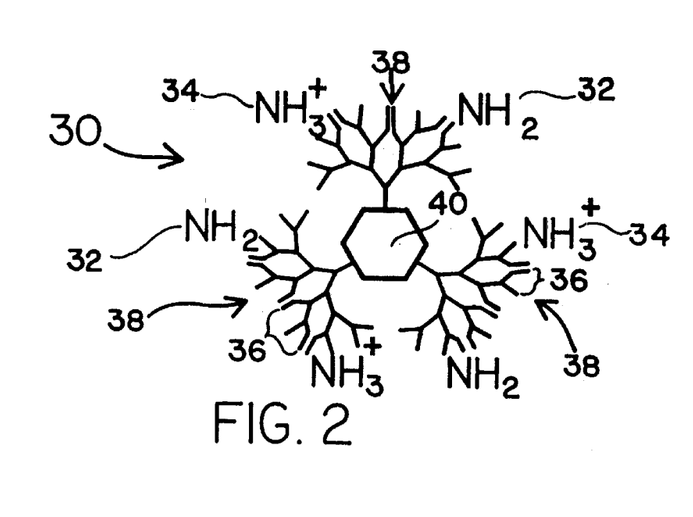
FIG. 2 is a schematic representation of a dendrimeric toner particle according to the invention.

The chelating agent groups coordinate or complex with charge directors for the electrophotography process. The charge directors may be, for example, metal ions, organic ions, ammonium ions, or alkyl, allyl or aryl substituted ammonium ions. In toner particle 30, for example, both $NH_2$ and $NH_3+$ groups are present at the terminus of the particle 30, with $NH_2$ groups being terminal chelating agent groups 32 that, with the presence of H+, become $NH_3+$ positive charge directors 34 with negative counter ions RCOO—, for example. Having both $NH_2$ and $NH_{3+}$ present at the terminus, and the unsymmetrical final polymer units 36 (on dendrons 38 extending out from core 40) illustrate that the dendrimeric toner particles according to this invention may be unsymmetrical as well as symmetrical.

Preferably, but not necessarily, the dendrimer toner particles are symmetrical, saturated-monomer-shell dendrimers grown to be in the size range of 0.001–0.04 nm. Preferably, but not necessarily, the dendrimer toner particle core has as least 2 functional sites, for building at least 2 dendrons on the dendrimer. These preferred features, of symmetry, saturated-shell generations, and plurality of dendrons, result in dendrimers that are small and yet have high charge-to-mass ratios, which character-istics are highly desirable in EP liquid toners. The dendrimeric toner particle is preferably less than about 12 generations, and likely to be in the range of 3–8 generations. Preferably, the dendrimeric toner particle has greater than 20 chelating agent groups, and, for particles of 3–8 generations, will often have 20–70 or more chelating agent groups. Particles of 10 generations of polymer units, for example, wherein each polymer unit has two pendent functional ends and the dendrons grow from two active sites on a core, may have $2^{10}$ or 1024 chelating agent groups. Dendrimeric toner particles outside these size ranges, or those that are less saturated or less symmetrical, also have advantages compared to prior art toners and are also included in the invention.

Advantages of this Invention Over What Has Been Done Before

The advantages of the dendrimeric type of toner particle include:
1. High monodispersity of particle identity.
2. High monodispersity of particle size.
3. High monodispersity of particle charge-to-mass ratio, and therefore monodispersity of electrophoretic behavior.
4. High dispersion stability and longer shelf life of the toner.
5. Smaller particle sizes than are presently possible with conventional multicomponent toners, improving print quality and color quality.
6. Synthesis of the toner can be continuous, rather than batch process.
7. Matching the solubility parameters of the repeated polymeric units and the dispersant will allow much higher concentrations of total solids to be present in the toner dispersion. This will make it possible to print down a toner cartridge from concentrate to empty and then discard, without having to devise replenishment schemes.

EXAMPLE 1

A dye-centered dendrimeric toner particle is constructed by the following method: Acridine yellow G is represented by the following Structure 1:

0.10 mole acridine yellow G is reacted in THF with an excess (e.g. 0.40 moles) of adipic acid to form Structure 2:

Structure 2 is reacted with 3,3'-imino-bispropylamine in excess to form Structure 3, of which a part is termed "Structure 4" for ease of illustration:

Structure 3 is then reacted again with adipic acid to form the polyamide Structure 5:

Structure 5 is reacted with 3,3'-imino-bispropylamine to yield Structure 6:

This reaction scheme is continued, alternating adipic acid and 3,3'-imino-bispropylamine reagents three more times. Each combination of adipic acid reaction followed by a 3,3'-imino-bispropylamine reaction is called the "reaction cycle" for this example. The final dendrimer toner particle thus represents five reaction cycles, forming amide linkages each time, plus, preferably, a final reaction with adipic acid to place COOH groups at the terminus of the particle. The terminal COOH groups act as chelating agent groups.

In Example 1, the dendrimer toner particle has two dendrons. Each dendron comprises alternating polymer units A and B, as shown above in Structure 6. Preferably, the COOH group of each polymer unit A reacts with a polymer unit B. Preferably, two sites on each polymer unit B (the two nitrogens nearer the end) each react with a polymer unit A. Thus, each polymer unit A can be considered to have one pendent functional end (COOH), and each polymer unit B can be considered to have two pendent functional ends (NH and $NH_2$).

The first reaction cycle starts the two dendrons by reacting a polymer unit A onto each of two active sites on the dye, and then a polymer unit B onto each polymer unit A. Each reaction cycle thereafter causes the dendrons to branch out, because each polymer unit B has two pendent functional ends. After five cycles, there are $2^5$ or 32 polymer units B at the outer perimeter or terminus of the dendrimer. If the final reaction with adipic acid is carried out, there are 64 COOH groups at the terminus, because the adipic acid reaction connects a COOH group to each of the two nitrogen functional ends on each of the 32 outer polymer units B. This structure results in the potential for complexing 64 metal ion charge directors on the carboxylate groups. If a base is added, there is the potential to have 64 negative charges on the outer perimeter of the dendrimeric toner particle. The particle size is on the order of 200 Å or 0.02 μm, and larger particles can be constructed if desired by repeated reaction steps.

The dendrimeric toner particle of Example 1 may be called a eleven-generation dendrimer, with each layer of polymer units considered a generation. With this approach to the terminology, each of the five reaction cycles forms two generations and the final adipic acid reaction forms the eleventh. Alternatively, each reaction cycle may be considered to form one generation, with a generation comprising a polymer unit A reacted with a polymer unit B, resulting with each generation having two pendent functional ends.

EXAMPLE 2

Pararosaniline base ("PRB") is represented below in two ways and labeled Structure 1:

In Step 1, 0.1 mole PRB is reacted with a >6:1 molar excess of acrylonitrile according to the following reaction to produce Structure 2:

In Step 2, Structure 2 is reduced with $H_2$ (g) in the presence of Raney cobalt catalyst to produce Structure 3:

Structure 3, which is the product recovered from Step 2, is reacted again with an excess of C≡C—C N (>12:1 molar ratio), at the conditions of Step 1, to produce Structure 4:

Structure 4 is then reacted with $H_2$ (g) and Raney cobalt, at the conditions of Step 2, to produce Structure 5:

The combination of Step 1 followed by Step 2 comprises an acrylonitrile-reduction "reaction cycle", which may be repeated as many times as desired, for example, yielding an approximately 0.01 μm particle after 8 cycles. The resulting particles are dispersed in Isopar™ L and a $Zr^{4+}$ Hex-cem soap is added. The $Zr^{4+}$ is complexed by the pendent —$NH_2$ groups to produce a (+) charge on the resulting dendrimeric toner particle and leave the R—COO— groups dispersed in the Isopar™ L. This charge separation is measured as an increase in conductivity of the dispersion after the addition of the Zr soap. Alternatively, other metal soaps with various charges may be used and are represented by the term "$M^{n+}$ soap", wherein "M" represents a metal and "n+" represents a charge on the metal.

EXAMPLE 3

"Fluorone Black", which is 9-phenyl-2,3,7-trihydroxy-6-fluorone and is represented below as Structure 1, is reacted with 3-Bromopropionitrile, in the presence of $K_2CO_3$ and 18-crown-6, as shown below to produce Structure 2:

Structure 2 is then reacted with $Co^{2+}$, $NaBH_4$, MeOH for 2 hours to produce Structure 3:

Steps 1 and 2 from Example 2 above are then performed and repeated as desired to result in dendrimeric particles, for example, of approximately 0.01 μm after eight cycles. These particles may be given a charge similarly to the Zr soap process of Example 2, or other metal soap processes, to produce dendrimeric toners.

EXAMPLE 4

Structure 2 from Example 3 above may be reacted in HCl, H₂O, and heat to produce Structure 4 shown below:

Structure 4 may then be reacted with Ac₂O, where Ac is diethylether, and pyridine to produce Structure 5 shown below:

Alternatively, Structure 4 may be reacted with benzylchloride, KOH, Me₂SO, at 25° C. to produce Structure 6 shown below:

Structures 5 and 6 are esters and each may be reacted with EtOH and H₂ at 3 atm over Pd catalyst to produce Structure 7 shown below:

wherein the terminal —COOR groups of either Structure 5 or 6 have been reduced to —CH₂OH groups.

EXAMPLE 5

In Step 1, Structure 2 from Example 3 may be reacted with anhydrous HCl and EtOH to produce Structure 8 shown below:

In Step 2, Structure 8 is then reacted with EtOH in H₂ at 3 atm over Pd catalyst to produce Structure 9 shown below:

In Step 3, Structure 9 is then reacted with Ph₃P and CBr₄ to substitute the terminal —OH groups of Structure 9 with —Br. The —Br-substituted-Structure 9, represented by [10], is reacted in Step 4, as shown below, to produce Structure 11:

wherein Structure 11 is represented by:

Structure 11 is then reacted as in Step 3 (Ph₃P, CBr) to substitute the terminal —OH groups with —Br to produce a —Br-substituted-Structure 11, represented by Structure 12 or [12]. Structure 12 is then reacted as in Step 4 to produce Structure 13, as shown below:

wherein Structure 13 is represented by:

Further reactions may be conducted to produce a dendrimeric toner particle with either a positive or negative charge director. For example, the dendrimer represented by Structure 13 may be reacted with an ester having an amine functionalized group, which may act as a chelating group for a H+ charge director. Alternatively, the Structure 13 dendrimer may be reacted with a mild oxidizing agent to produce a carboxylate, which may be coordinated with a positive or negative charge director, as described above in Example 1. Alternatively, the Structure 13 dendrimer may be otherwise reacted to covalently bond with other chelating groups.

Various dendritic chemistry methods, including divergent in-situ construction, divergent core anchoring, and convergent methods, may be used to construct the dendrimeric toner particle according to this invention. The term "reacting polymer units onto a plurality of functional groups of a core to build dendrons of one or more generations that branch out from the core" is intended to include all divergent and convergent methods, including in-situ and anchoring methods.

Although this invention has been described above with reference to particular means, materials and embodiments, it is to be understood that the invention is not limited to these disclosed particulars, but extends instead to all equivalents within the scope of the following claims.

What is claimed is:

1. A dendrimeric toner particle for use in liquid electrophotography comprising:

a core comprising a colorant, and a plurality of dendrons covalently attached to and branching radially out from the core, each of said dendrons comprising:
a polymer unit comprising a resin, and
a final polymer unit comprising at least one coordinating group for a charge director.

2. A dendrimeric toner particle as set forth in claim 1, wherein the diameter of the dendrimeric toner particle is 0.001 to 0.04 nm.

3. A dendrimeric toner particle as set forth in claim 1, wherein the dendrimeric toner particle is a 3 to 12 generation dendrimer.

4. A dendrimeric toner particle as set forth in claim 1, wherein the dendrimeric toner particle comprises 20 to 1024 coordinating groups.

5. An electrophotographic method comprising:
(a) establishing a uniform charge on a photoconductor;
(b) exposing said photoconductor to light to form a latent image on said photoconductor; and
(c) developing said latent image with a liquid toner comprising a dendrimeric toner particle comprising:
a core comprising a colorant and a plurality of dendrons covalently attached to and branching radially out from the core,
wherein each of the dendrons comprise a polymer unit comprising a resin and a final polymer unit comprising at least one coordinating group for charge director.

6. An electrophotogaphic method as set forth in claim 5, wherein the diameter of the dendrimeric toner particle is 0.001 to 0.04 nm.

7. An electrophotographic method as set forth in claim 5, wherein the dendrimeric toner particle is a 3 to 12 generation dendrimer.

8. An electrophotographic method as set forth in claim 5, wherein the dendrimeric toner particle comprises 20 to 1024 coordinating groups.

* * * * *